Jan. 31, 1961 T. M. WRIGHT 2,969,861
CLUTCHES
Original Filed Aug. 14, 1956
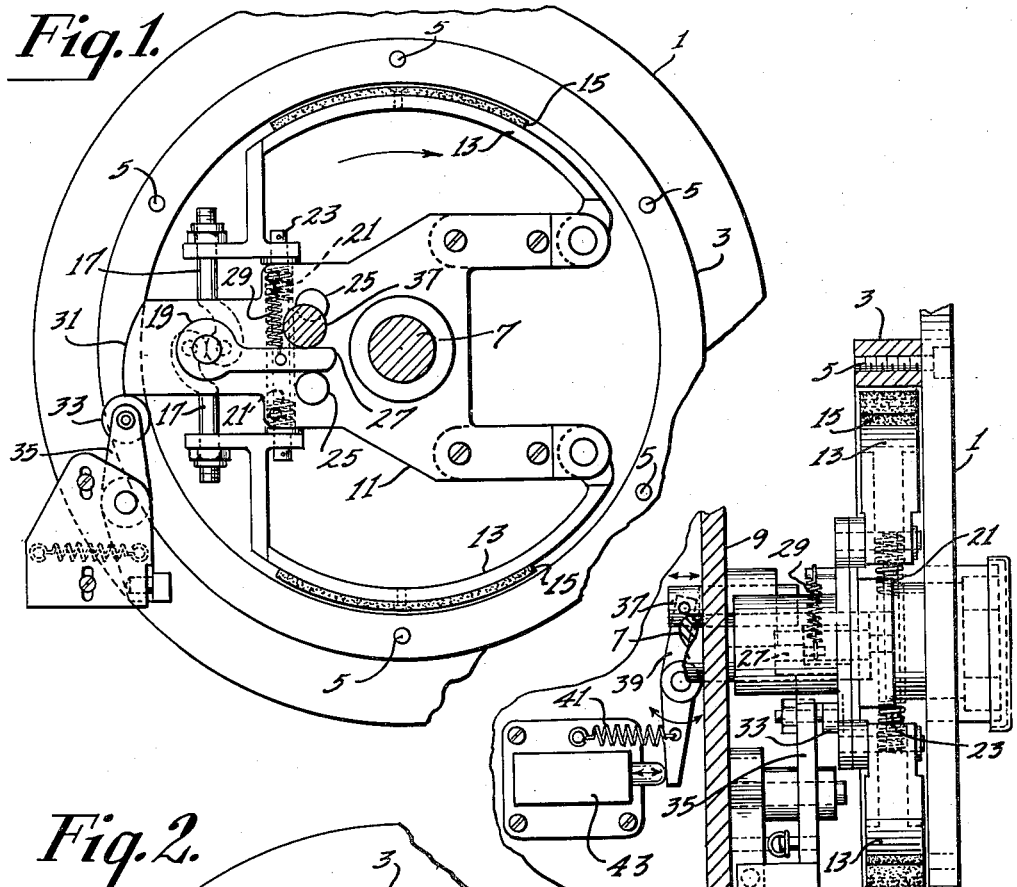
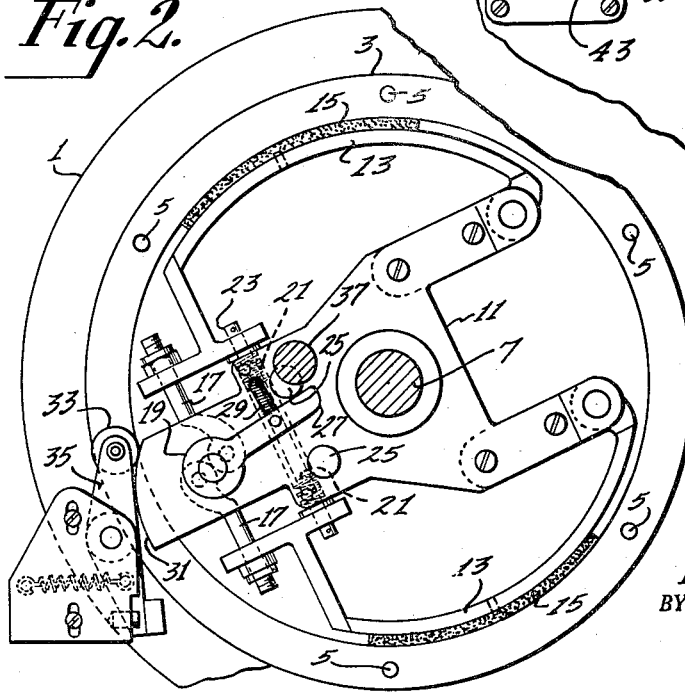
INVENTOR.
Theodore M. Wright
BY
ATTORNEY.

United States Patent Office 2,969,861
Patented Jan. 31, 1961

2,969,861

CLUTCHES

Theodore M. Wright, 934 Haddon Ave., Camden, N.J.

Original application Aug. 14, 1956, Ser. No. 603,967, now Patent No. 2,896,214, dated July 28, 1959. Divided and this application Apr. 12, 1957, Ser. No. 652,588

9 Claims. (Cl. 192—26)

This invention relates to clutches, and more particularly to clutches of the single revolution type. The present application is a division of my copending application Ser. No. 603,967, filed August 14, 1956, now Patent No. 2,896,214, granted July 28, 1959 for Wire Staple Handling Apparatus, and involves a clutch such as disclosed in my copending application, Ser. No. 525,534, filed August 1, 1955, now Patent No. 2,801,692, granted August 6, 1957 for Apparatus for the Sensing and Registration of Sheets.

Many types of apparatus have movable parts which are brought into operation only periodically. In such apparatus, a clutch of the single revolution type is frequently employed for coupling a continuously operating driving member to the normally stationary, but movable, parts to impart movement to such parts at various times.

The primary object of my present invention is to provide an improved single revolution type clutch which can be employed effectively in a wide variety of apparatus in which intermittently operable parts are incorporated.

More particularly, it is an object of my present invention to provide an improved single revolution type clutch which is rugged in construction and which can be constructed to operate effectively over a wide range of speeds and with a wide range of loads.

Another object of my present invention is to provide an improved clutch of the type set forth which is quick acting and which is without appreciable slippage between the driving and driven members thereof when these members are brought into engaging relation.

Still another object of my present invention is to provide an improved clutch of the type set forth in which positive disengagement of the driven member from the driving member is quickly effected when the driven member is stopped.

A further object of my present invention is to provide an improved clutch as aforesaid in which the driven member can be positively disengaged from the driving member irrespective of the speed at which the clutch is rotated.

It is also an object of my present invention to provide an improved single revolution type clutch which is relatively simple in construction, which has a minimum number of parts, and which is highly efficient in use.

The invention itself, both as to its organization and method of operation, as well as additional objects and advantages thereof, will be understood more readily from the following description, when read in connection with the accompanying drawing, in which Figure 1 is an elevational view of a single revolution type clutch according to my present invention, the driving and driven members of the clutch being shown in disengaged relation, Figure 2 is a view similar to Figure 1, but showing the driving and driven members in engaged relation, and Figure 3 is a side view of the clutch.

Referring more particularly to the drawing, there is shown a flywheel 1 which may be coupled to and receive power from the drive shaft of a suitable motor. A clutch drum 3 is secured to the face of the flywheel 1 by suitable bolts 5. A normally stationary shaft 7, which is to be driven intermittently, extends through a panel 9 and into coaxial alignment with the clutch drum 3. The end of the shaft 7 carries a clutch yoke 11. The shaft 7 also carries one or more cams, gears or the like (not shown) through which a timed sequence of operations can be effected upon rotation of the shaft 7.

Pivotally secured to the yoke 11 at on end is a pair of clutch shoes 13 with suitable linings 15 thereon. The other end of each of the shoe members 13 is coupled to the opposite end of the yoke 11 by an eccentric toggle arrangement which includes a pair of toggle links 17 eccentrically mounted on a toggle key 19. The toggle key 19 is pivotally mounted on the yoke 11. The toggle ends of the two shoe members 13 are normally biased apart by a main clutch spring 21. The spring 21 surrounds a guide pin 23 which extends through end portions on the shoe members 13. A pair of studs 25 extend out from the face of the yoke 11 and are positioned to limit the rotational movement of the toggle key 19 by engagement with an arm 27 which extends from the hub of the toggle key. A spring 29 is coupled to the arm 27 of the toggle key 19 and biases that key in a direction to augment the separating force applied to the shoes 13 by the spring 21.

The end of the yoke 11 adjacent to the toggle constitutes a cam surface 31 which engages an indexing roller 33 carried by a spring biased arm 35 positioned adjacent to the clutch. A clutch pin 37 extends through the panel 9 (see Fig. 3) and engages the arm 27 of the toggle key 19. The pin 37 is retractable from engagement with the arm 27 by operation of a lever 39 which is biased by a spring 41 and actuated by a solenoid motor 43.

In the idle condition, as shown in Fig. 1, the flywheel 1, with the clutch drum 3, is continuously rotated by the driving motor. The clutch shoes 13 are held out of engagement with the drum 3 by operation of the toggle arrangement. The arm 27 on the toggle key 19 is normally held by the clutch pin 37 held in position to cause disengagement of the shoes 13. With the clutch pin extended, as in Fig. 1, the arm 27 of the toggle key is held securely between the clutch pin 37 and the lowermost of the studs 25. The clutch yoke 11 is prevented from moving in a reverse direction by the indexing roller 33 which engages the yoke 11 adjacent the cam surface 31.

When the solenoid motor 43 is energized by operation of a suitable switch (not shown), the lever 39 is operated to retract the clutch pin 37. When the pin 37 is retracted, the arm 27 of the toggle key 19 is pulled by the spring 29 to shift the toggle bolts 17 and thus allow the spring 21 to move the shoes 13 into driving engagement with the drum 3. The upward movement of the arm 27, as viewed in Fig. 1, is limited by the uppermost one of the studs 25. When the shoes 13 are moved into engagement with the drum 3, the yoke 11 is rotated, carrying the shaft 7 with it. By the time the yoke 11 nears the completion of one revolution, the pin 37 will have been returned to its normal or rest position. The arm 27 of the toggle key 19 thereupon comes into contact with the side of the pin 37. The inertia of the clutch carries the mechanism with at least enough force to cause the coaction of the arm 27 and the pin 37 to overcome the force of the spring 29 and the spring 21 to disengage the shoes 13 from the drum 3. At about the same time that the arm 27 comes into contact with the pin 37, the roller 33 engages the cam surface 31 of the yoke 11. As the roller 33 moves outwardly on the cam surface, the spring bias on the roller arm 35 adds a further decelerating force to the yoke 11. The position of the roller 33 is made adjustable so that it drops over the edge of the cam surface 31 at the instant that the arm 27 is locked between the pin 37 and the stud 25. This arrangement positively locks and indexes the yoke 11 and, hence, the shaft 7 in rest position, ready to start another cycle whenever the pin 37 is retracted.

From the foregoing description, it will be apparent that I have provided an improved single revolution type clutch which is positive in operation, which is quick acting, and which readily lends itself to use in many types and forms of apparatus in which normally stationary, intermittently operable, movable parts are to be operated from a constantly movable source of power. Although only a single embodiment of my improved clutch has been described, it will undoubtedly be readily apparent to those skilled in the art that other forms thereof, as well as changes in the particular form described herein, are possible within the spirit of this invention. Hence, I desire that the following description shall be considered in an illustrative, and not in a limiting, sense.

I claim as my invention:

1. A clutch mechanism for coupling a rotary driving member and a driven member into and out of driving relation with each other comprising a clutch drum carried by said driving member, a coupling device adapted to be connected to said driven member in locking engagement therewith, a pair of clutch shoes each movably mounted on said coupling device at one of its ends for movement from a first position out of engagement with said drum to a second position in engagement with said drum and vice versa, biasing means connected between the other ends of said shoes tending to bias said shoes into said second position thereof in engagement with said drum to thereby establish driving relation between said driving and driven members, and actuating means carried by said coupling device connected to said shoes for effecting movement of said shoes into their said first position in opposition to said biasing means whereby to normally maintain said driving and driven members in out-of-driving relation with each other.

2. A clutch mechanism for coupling a rotary driving member and a driven member into and out of driving relation with each other comprising a clutch drum carried by said driving member, a coupling device connected to said driven member in locking engagement therewith, a pair of clutch shoes each movably mounted on said coupling device at one of its ends for movement from a first position out of engagement with said drum to a second position in engagement with said drum and vice versa, biasing means connected between the other ends of said shoes tending to bias said shoes into said second position thereof in engagement with said drum to thereby establish driving relation between said driving and driven members, and actuating means carried by said coupling device in laterally spaced relation to said driven member and including eccentric link means connected to said shoes for effecting movement of said shoes into their said first position in opposition to said biasing means whereby to normally maintain said driving and driven members in out-of-driving relation with each other.

3. A clutch mechanism for coupling a rotary driving member and a driven member into and out of driving relation with each other comprising a clutch drum carried by said driving member, a coupling device adapted to be connected to said driven member in locking engagement therewith, a pair of clutch shoes each movably mounted on said coupling device at one of its ends for movement from a first position out of engagement with said drum to a second position in engagement with said drum and vice versa, biasing means connected between the other ends of said shoes tending to bias said shoes into said second position thereof in engagement with said drum to thereby establish driving relation between said driving and driven members, movable actuating means carried by said coupling device in laterally spaced relation to said driven member and including an arm movable therewith, said actuating means being connected to said shoes for effecting movement of said shoes into their said first position in opposition to said biasing means whereby to normally maintain said driving and driven members in out-of-driving relation with each other, and means for confining said arm against movement to thereby releasably lock said actuating means in one position for normally holding said shoes in their said first position, said last named means including a movable element withdrawable from said arm to thereby release said actuating means for movement to another position wherein said biasing means becomes free to force said shoes into their said second position to thereby establish driving relation between said driving and driven members.

4. The invention as set forth in claim 3 characterized in that said driving member is adapted to drive said driven member in a given direction upon engagement of said shoes with said drum, and characterized further by the addition of means cooperable with said coupling device for locking said coupling device and said driven member against movement in the opposite direction when said shoes are disengaged from said drum.

5. The invention as set forth in claim 3 characterized in that said coupling device comprises a yoke member, characterized further in that said shoes are pivotally connected each to a separate arm of said yoke member and are disposed in diametrically opposed relation, and characterized still further in that said actuating means includes a toggle device, said arm extending from said toggle device for engagement with said confining means when said confining means is disposed in a predetermined position.

6. A clutch mechanism for rotating apparatus comprising a driving member, a clutch drum carried by said driving member, a driven member, a normally idle yoke carried by said driven member, a pair of clutch shoes each movably mounted on said yoke at one of its ends for engagement with said drum, biasing means connected between the other ends of said shoes tending to bias said shoes into engagement with said drum, toggle means coupling said shoes to said yoke to control the actuation of said clutch, means including an indexing device engageable with said yoke for determining said idle position of said yoke, a movable clutch pin engageable with said toggle means for disengaging said clutch, means normally maintaining said clutch pin in a position to be engaged by said toggle means, and means for moving said clutch pin out of said position to thereby retract said clutch pin from engagement with said toggle means whereby to permit said biasing means to effect engagement of said shoes with said drum.

7. A clutch mechanism for rotating apparatus comprising a driving member, a clutch drum carried by said driving member, a driven member, a normally idle yoke carried by said driven member, a pair of clutch shoes each movably mounted on said yoke at one of its ends for engagement with said drum, biasing means connected between the other ends of said shoes tending to bias said shoes into engagement with said drum, toggle means coupling said shoes to said yoke to control the actuation of said clutch, said toggle means including a laterally extending arm, means including an indexing device engageable with said yoke for determining said idle position of said yoke, a movable clutch pin engageable with said arm for actuating said toggle means to disengage said clutch shoes from said drum, means normally maintaining said clutch pin in a position to be engaged by said arm, and means for moving said clutch pin out of said position to thereby retract said clutch pin from engagement with said arm whereby to permit said biasing means to effect engagement of said shoes with said drum.

8. A clutch mechanism according to claim 7 wherein said yoke includes cam means, and wherein said indexing device includes a spring-biased, movable roller disposed in a position to be engaged by said cam means upon rotation of said yoke in response to engagement of said shoes with said drum, the force applied to said yoke at said cam means by said roller being effective to decelerate said yoke as said yoke nears completion of a single rotation thereof.

9. A clutch mechanism according to claim 7 wherein said yoke includes cam means, and wherein said indexing device includes a spring-biased, movable roller disposed in a position to be engaged by said cam means upon rotation of said yoke in a first direction in response to engagement of said shoes with said drum, the force applied to said yoke at said cam means by said roller being effective to decelerate said yoke as said yoke nears completion of a single rotation thereof in said first direction, and said roller being adapted to assume a position against said yoke when said yoke has completed its said single rotation to prevent rotation of said yoke in an opposite direction.

References Cited in the file of this patent
UNITED STATES PATENTS

| | | |
|---|---|---|
| 553,983 | Heath et al. | Feb. 4, 1896 |
| 2,130,486 | Florcyk | Sept. 20, 1938 |
| 2,136,381 | Hile | Nov. 15, 1938 |
| 2,411,543 | Kann | Nov. 26, 1946 |
| 2,634,840 | Bornzin | Apr. 14, 1953 |